No. 618,918. Patented Feb. 7, 1899.
S. G. STOODLEY.
PAN FOR WASHING GOLD.
(Application filed Feb. 7, 1898.)

(No Model.)

Witnesses
J. E. Seamunn
4. J. Riggs.

Inventor
Sam. G. Stoodley.
by C. H. Riches
his attorney,

THE NORRIS PETERS CO., PHOTO-LITHO., WASHINGTON, D. C.

UNITED STATES PATENT OFFICE.

SAMUEL G. STOODLEY, OF TORONTO, CANADA.

PAN FOR WASHING GOLD.

SPECIFICATION forming part of Letters Patent No. 618,918, dated February 7, 1899.

Application filed February 7, 1898. Serial No. 669,316. (No model.)

*To all whom it may concern:*

Be it known that I, SAMUEL G. STOODLEY, of the city of Toronto, in the county of York and Province of Ontario, Canada, have invented certain new and useful Improvements in Pans for Washing Gold; and I hereby declare that the following is a full, clear, and exact description of the same.

This invention relates to a pan for washing gold from a placer mine—that is, separating the gold dust and nuggets from the dirt with which it is associated; and the object of the invention is to so construct the pan that it will cause the complete separation of the gold-dust from the dirt and gather the gold-dust into a bowl containing quicksilver or amalgam in order that when it is desired to remove the gold the water and dirt can be separated from the amalgam and gold-dust by tilting the pan into a sufficiently-inclined position to cause the water and dirt to lodge against the rim and expose the amalgam, but not sufficient, however, to cause the displacement of the amalgam from the bowl, so that the amalgam and gold-dust can be removed from the bowl and placed in a chamois bag, after which the water and dirt can be emptied from the pan; and the invention consists, essentially, of a pan consisting of a rounded bottom of a substantially semispherical shape and a frusto-conical rim extending upwardly from the bottom, the curvature of the bottom gradually meeting the lines of the rim, a false concaved bottom within the pan, a bowl interposed between the false bottom and the true bottom of the pan, and an opening through the false bottom into the bowl, as hereinafter more fully set forth, and more particularly pointed out in the claims.

Figure 1:
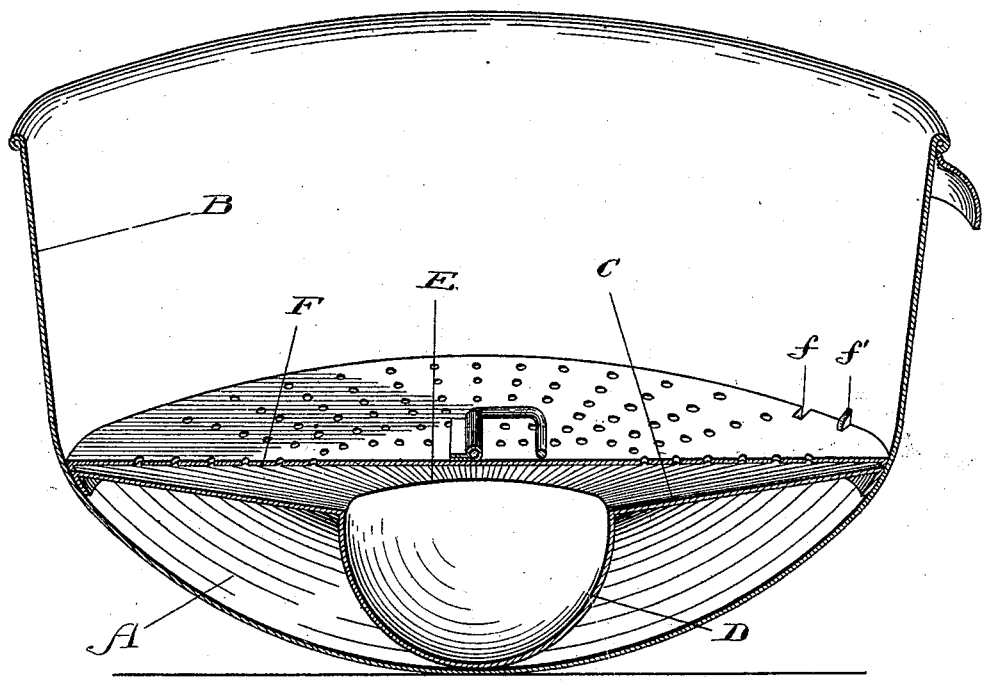
Figure 2:
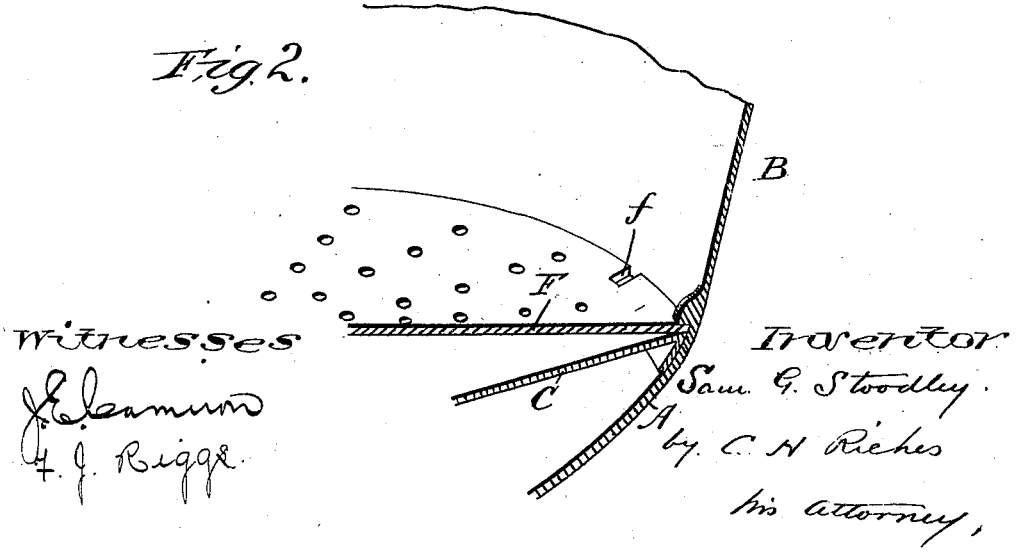

In the drawings, Figure 1 represents a sectional perspective view of the pan. Fig. 2 is a detail view of the lug for holding the strainer.

Like letters of reference refer to like parts throughout the specification and drawings.

A represents the bottom of the pan, which is of a substantially semispherical shape.

B represents the side or rim, which is of any required depth and diameter. The rim or side B is of a substantially frusto-conical shape, the greater diameter being at the top and the lesser diameter at the bottom or point where it meets the semispherical bottom A. The curve of the bottom A gradually meets the rim or side B, so that no sharp corner or edge will be presented to cause a jerking or jumping action.

The interior of the pan is provided with a false bottom C, connected to the bottom of the rim or side B at its point of union with the true bottom A. The false bottom C is concaved, and interposed between the center of the false bottom C and the true bottom A is a bowl D of a semispherical form. Formed centrally through the false bottom C is an opening E into the bowl D. Supported upon the false bottom C is a perforated plate or strainer F of substantially the same diameter as the interior diameter of the rim or side B. The edge of the strainer F is provided with a radial groove $f$, and the inner face of the rim B is provided with a lug $f'$. In assembling the strainer F into the pan the slot $f$ is opposed to the lug $f'$, and when the strainer F is pressed below the lug $f'$ it is turned slightly to the right or left to displace the slot $f$ from alinement with the lug $f'$. This construction removably holds the strainer in position.

In the use of the invention the bowl D is filled or partially filled with quicksilver. The dirt containing the gold-dust is placed on the strainer and washed through to the false bottom C by the water or other washing fluid in the pan. The pan is rocked upon the true bottom A, which serves as a rocker for tilting and rocking the pan in any desired direction, and the rocking action is continued until the complete separation of the gold-dust from the dirt has taken place. The false bottom C being concaved causes the heavy substances in the pan to move toward the center, and the gold-dust being heavier than the quicksilver settles to the bottom of the bowl D. The earth and washing fluid being lighter than the quicksilver float on top. When the separation has taken place, the pan is tilted into an inclined position sufficient to cause the dirt and water to move from the bowl to the rim, leaving the quicksilver in the bowl exposed. The quicksilver and gold-dust are then scooped out of the bowl and placed in a chamois bag or other receptacle. After this part of the operation has been performed the dirt and washing fluid are removed from the pan and the pan thoroughly cleansed. The chamois bag containing the quicksilver is squeezed over the bowl until the quicksilver oozes out of it and drops into the bowl. After the quicksilver is squeezed from the bag the gold-dust only remains, which is collected and placed away in a safe receptacle.

A pan constructed on this principle will completely separate the gold-dust from the dirt and collect the gold-dust in such a manner that it can be easily secured. Again, by providing the pan with a rounded bottom and gradually curving the lines of the bottom into the sides the pan can be rocked easily and regularly without any danger of a jarring or jolting motion of the contents. The purpose of the strainer is to break up the mass of dirt and gold-dust as they pass to the false bottom, to facilitate the washing of the gold, and complete the separation of the gold from the dirt. The gold and dirt roll down the false bottom to the bowl, and the gold being of a greater specific gravity than the quicksilver rapidly sinks to the bottom, while the dirt being of a less specific gravity than the quicksilver floats on the top.

Having thus fully described my invention, what I claim as new, and desire to secure by Letters Patent, is—

1. A gold-washing pan embracing in its construction a substantially semispherical-shaped bottom, a cylindrical side or rim projecting upwardly from the bottom, an internal false bottom within the cylindrical rim, a bowl interposed between the false bottom and semispherical-shaped bottom, and an opening through the false bottom into the bowl, substantially as specified.

2. A gold-washing pan consisting of a substantially semispherical-shaped bottom, a rim or side united to the bottom, the bottom gradually curving into the side, a concaved false bottom within the pan, a bowl located centrally between the false bottom and the true bottom, and a central opening through the false bottom into the bowl, substantially as specified.

3. A gold-washing pan consisting of a substantially semispherical-shaped bottom, a rim or side united to the bottom, the bottom gradually curving into the side, a concaved false bottom within the pan, a bowl located centrally between the false bottom and the true bottom, a central opening through the false bottom into the bowl, and a perforated plate or strainer supported above the false bottom, substantially as specified.

Toronto, February 1, A. D. 1898.

SAMUEL G. STOODLEY.

In presence of—
  J. E. CAMERON,
  C. H. RICHES.